(12) United States Patent
Oliver

(10) Patent No.: US 8,301,650 B1
(45) Date of Patent: Oct. 30, 2012

(54) BLOOM FILTER COMPACTION

(75) Inventor: David C. Oliver, San Antonio, TX (US)

(73) Assignee: Google, Inc., Mountain View, CA (US)

( * ) Notice: Subject to any disclaimer, the term of this patent is extended or adjusted under 35 U.S.C. 154(b) by 186 days.

(21) Appl. No.: 12/630,711

(22) Filed: Dec. 3, 2009

Related U.S. Application Data

(60) Provisional application No. 61/139,322, filed on Dec. 19, 2008.

(51) Int. Cl.
*G06F 7/00* (2006.01)
(52) U.S. Cl. ....................................... 707/758
(58) Field of Classification Search ............... 707/754, 707/758
See application file for complete search history.

(56) References Cited

U.S. PATENT DOCUMENTS

| | | | |
|---|---|---|---|
| 2006/0294311 A1* | 12/2006 | Fu et al. | 711/118 |
| 2008/0147714 A1* | 6/2008 | Breternitz et al. | 707/102 |
| 2009/0183159 A1* | 7/2009 | Michael et al. | 718/101 |

* cited by examiner

*Primary Examiner* — Truong Vo
(74) *Attorney, Agent, or Firm* — Sterne, Kessler, Goldstein & Fox, P.L.L.C.

(57) ABSTRACT

Systems and methods for Bloom filter compaction are described herein. A method embodiment includes reading a data corpus, inserting a plurality of data items from the data corpus into a Bloom filter, determining a number of the data items inserted, calculating a desired filter size based on the number, and constructing a compact Bloom filter based on the desired filter size. Another method embodiment includes generating a second bit vector from a first bit vector associated with a first Bloom filter, generating an empty second Bloom filter of a size based on the first bit vector, dividing the first Bloom filter's bit vector into a plurality of slices, and setting the second Bloom filter's bits based on an evaluation of the corresponding bits in each slice of the first Bloom filter's bit vector.

22 Claims, 7 Drawing Sheets

$$nc_i = n_i \oplus n_{i+k} \oplus n_{i+2k} \bullet \bullet \bullet \bullet \bullet \bullet \oplus n_{i+(r-1)k}$$

BLOOM FILTER COMPACTION

CROSS REFERENCE TO RELATED APPLICATIONS

This patent application claims the benefit of U.S. Provisional Patent Application No. 61/139,322, filed Dec. 19, 2008, entitled "Bloom Filter Compaction," which is incorporated herein by reference in its entirety.

BACKGROUND

1. Field of the Invention

Embodiments of the present invention relate to Bloom filters.

2. Background Art

A Bloom filter is a compact data structure used for probabilistic representation of a data set in order to support membership queries. Membership queries using a Bloom filter check if an element is a member of the data set. Although a Bloom filter is known to be a compact data structure, the cost of such a compact representation is a small probability of false positives which may occur when a Bloom filter sometimes incorrectly recognizes an element to be a member of a set. However in most cases, such false positives are a convenient tradeoff compared to reduced data storage size and faster lookup time when using a Bloom filter.

Bloom filters have been used in database applications to store large amounts of static data and allow reduction in the time it takes to lookup data from a slow storage device to faster main memory. They are found to be particularly useful in data management for modeling, storing, indexing, and querying data and services hosted by numerous, heterogeneous computing nodes.

Bloom filters may be compressed to improve performance. This may be particularly useful when the Bloom filter is passed as a message between computing nodes, particularly when information must be transmitted repeatedly, and its transmission size is a limiting factor. The cost associated with compressed Bloom filters includes processing time for compression and decompression.

Compressed Bloom filters must be read into memory in their entirety. This can make them unsuitable for certain applications with memory constraints. Various data compression techniques can take advantage of sparsely populated Bloom filters. However, such techniques cannot be applied to non-sparse Bloom filters as they are incompressible. Furthermore, Bloom filters, even if empty or unpopulated with data, may use large amounts of disk space, increasing not only storage costs, but also disk seek time when the Bloom filters are accessed.

In addition, user corpuses or databases storing user data may vary dramatically in size and composition, and it is not possible to estimate the size needed for a Bloom filter to store such data prior to creating one for each user. Creating a Bloom filter for each user would traditionally require building a second Bloom filter and an additional step of re-reading the entire corpus of user data into the second Bloom filter.

Present approaches of compressing, decompressing and creating separate Bloom filters not only increase the amount of processing involved but also increase the time taken for such processing.

BRIEF SUMMARY

Embodiments of the present invention relate to Bloom filter compaction. A method embodiment includes reading a data corpus, inserting a plurality of data items from the data corpus into a Bloom filter, determining a number of the data items inserted, calculating a desired filter size based on the number, and constructing a compact Bloom filter based on the desired filter size.

Another method embodiment includes generating a second bit vector from a first bit vector associated with a first Bloom filter, generating an empty second Bloom filter of a size based on the first bit vector, dividing the first Bloom filter's bit vector into a plurality of slices, and setting the second Bloom filter's bits based on an evaluation of the corresponding bits in each slice of the first Bloom filter's bit vector.

A system embodiment includes a Bloom filter populator to insert a plurality of data items from a data corpus into a first Bloom filter, and a compact Bloom filter generator to determine a number of the inserted data items and construct a compact Bloom filter based on at least the number. The compact Bloom filter generator further comprises a size estimator to calculate an optimal filter size based on the number of inserted data items and a compaction value calculator to calculate a compaction value based on the size of the first Bloom filter and the optimal filter size.

In this way, a compact Bloom filter may be generated without re-reading the data corpus to populate the compact Bloom filter. Thus, the compact Bloom filter is generated in a single pass over the data corpus.

Further embodiments, features, and advantages of the invention, as well as the structure and operation of the various embodiments of the invention are described in detail below with reference to accompanying drawings.

BRIEF DESCRIPTION OF THE DRAWINGS

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments of the invention relate to systems and methods for compacting Bloom filters. Embodiments of the invention include reading a data corpus, inserting a plurality of data items from the data corpus into a Bloom filter, determining a number of the data items inserted, calculating a desired filter size based on the number, and constructing a compact Bloom filter based on the desired filter size.

In this way, a compact Bloom filter may be generated without re-reading the data corpus to populate the compact Bloom filter. Thus, the compact Bloom filter is generated in a single pass over the data corpus.

This detailed description of the embodiments of the present invention is divided into several sections as shown by the following table of contents.

Table of Contents

Figure 1:
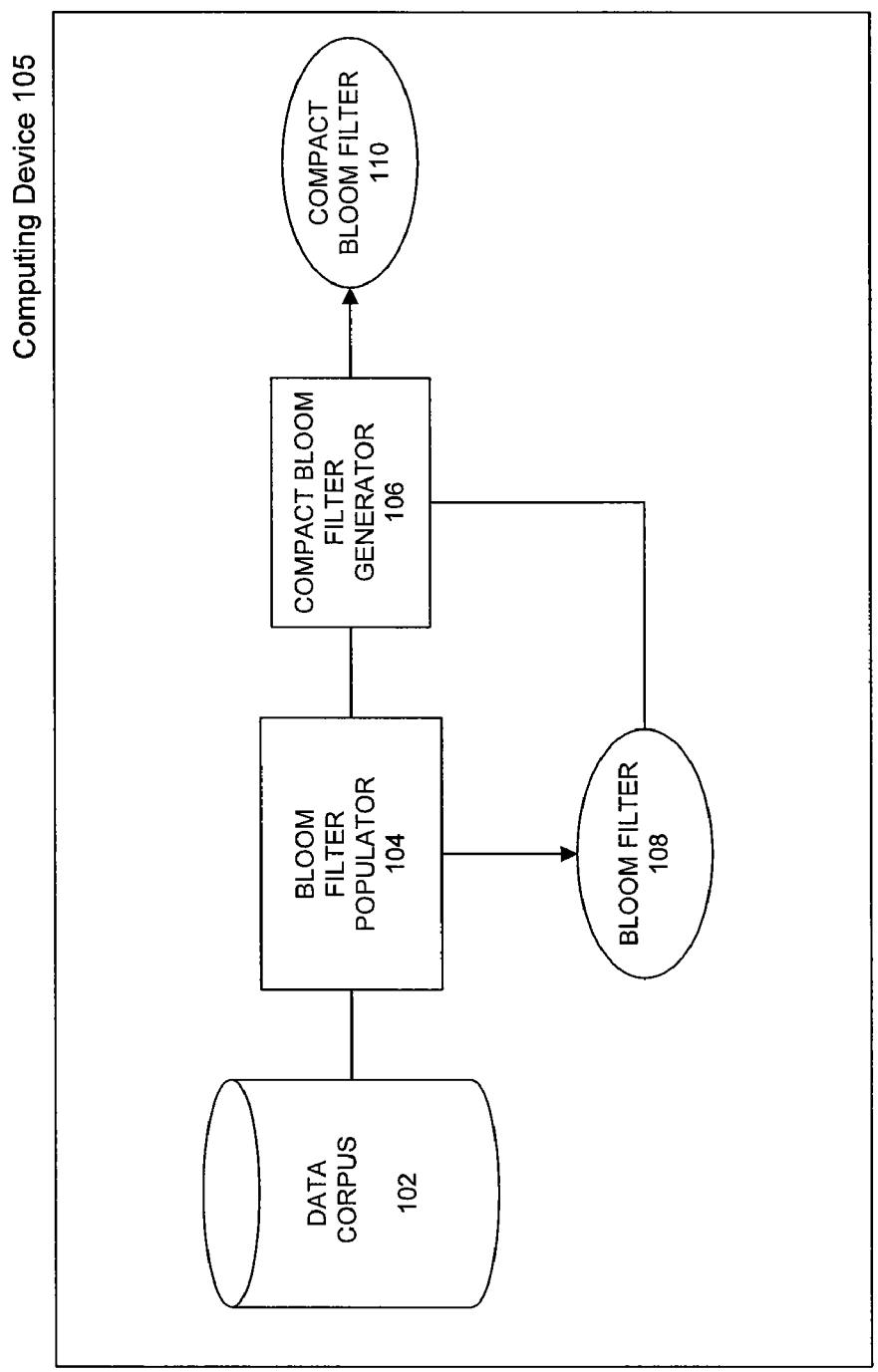
FIG. 1 is a diagram of a system for Bloom filter compaction, according to an embodiment of the invention.

1. System
2. Exemplary Overall Operation
3. Compact Bloom Filter Generator
4. Example Computer Embodiment 1. System This section describes a system for compaction of a Bloom filter according to an embodiment of the invention illustrated in FIG. 1. FIG. 1 is a diagram of system 100 that can be used to generate a compact Bloom filter 110.

System 100 includes a computing device 105. Computing device 105 can be any type of computing device having one or more processors. For example, computing device 105 can be a workstation, mobile device, computer, cluster of computers, set-top box, or other device having at least one processor. Such a computing device may include software, firmware, hardware, or a combination thereof. Software may include one or more applications and an operating system. Hardware can include, but is not limited to, a processor, memory and graphical user interface display.

According to an embodiment, computing device 105 may include Bloom filter populator 104, compact Bloom filter generator 106, Bloom filter 108, compact Bloom filter 110 and data corpus 102. While the following embodiment is described in terms of Bloom filters and emails, the invention is not limited to this embodiment. Other filters that support membership queries and accomplish functions similar to those of Bloom filters may be used. Filters can also be applied to content other than emails.

Data corpus 102 may be coupled to computing device 105 and may store any form of data for use by computing device 105. Bloom filter populator 104, compact Bloom filter generator 106, Bloom filter 108, and compact Bloom filter 110 may retrieve data from or store data to user corpus 102. As an example, such form of data may include data associated with such as user emails, data items such as words or any other content in user emails or other forms of electronic communication. As an example, not intended to limit the invention, data corpus 102 may be a storage device such as a hard disk drive or any other form of volatile or non-volatile storage. Data corpus 102 may also store a plurality of terms or term pairs appearing within the content of a user's email. Terms and term pairs are described further below.

Figure 2A:
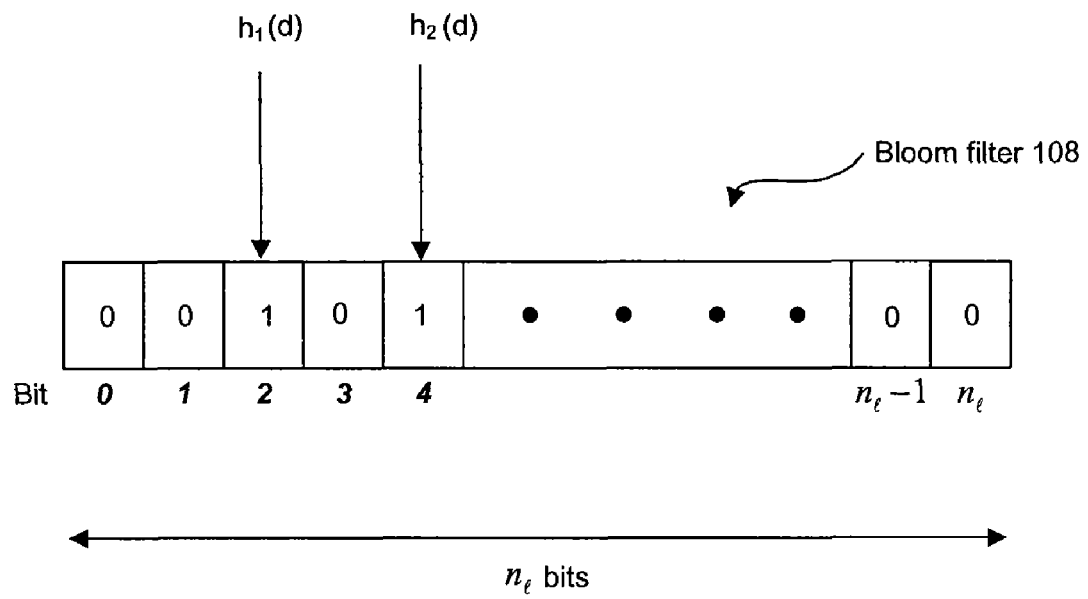
FIG. 2A illustrates the use of exemplary hash functions to map a data item into a Bloom filter, according to an embodiment of the invention.

Bloom filter 108 is a Bloom filter that is instantiated by Bloom filter populator 104. FIG. 2A is a diagram illustrating an exemplary embodiment of Bloom filter 108. As illustrated in FIG. 2A, Bloom filter 108 is a bit vector of '$n_l$' bits. $n_l$ is an integer corresponding to the number of bits or length of the bit vector. In an embodiment, Bloom filter 108 is instantiated as an empty Bloom filter. As an example, all of the bits in Bloom filter 108 may be set to '0' when Bloom filter 108 is empty.

Bloom filter 108 may be associated with a number of k 'hash' functions, where k is an integer corresponding to the number of hash functions. As known to those skilled in the art, hash functions are associated with a Bloom filter and are used to insert data items into the Bloom filter.

Exemplary FIG. 2A, illustrates hash functions $h_1$ and $h_2$, each of which maps a data item 'd' to one of the $n_l$ bit positions of Bloom filter 108. A data item, for example, may include one or more alphabetic, numeric or alphanumeric characters or any other content appearing within an email. To enter a data item into a Bloom filter 108, Bloom filter populator 104, for example, may run data item 'd' through both hash function $h_1$ and hash function $h_2$ and then place the result of each of the hash functions as an offset into the bit vector of Bloom filter 108, turning on (or setting to '1') a bit that is at a bit position determined by the result of each of the hash functions. In this example, bit 2 and bit 4 have been set to '1' in Bloom filter 108 by performing hashing operations $h_1(d)$ and $h_2(d)$ respectively. If a bit in Bloom filter 108 is already set to '1', Bloom filter populator 104 may leave it on. Thus, each data item 'd' that is to be inserted into Bloom filter 108 may be run through different hash functions (e.g. $h_1$, $h_2$, $h_3$, $h_4$, $h_5$, . . . $h_n$) by Bloom filter populator 104 to insert data items into Bloom filter 108. As an example, hash functions (e.g. $h_1$, $h_2$, $h_3$, $h_4$, $h_5$, . . . $h_n$) associated with Bloom filter 108 are configured so that their range matches the length of the bit vector of Bloom filter 108 (e.g. $n_l$ bits). Thus, for example, if a bit vector is 200 bits long, the hash functions may return a value between 0 and 199.

Bloom filter populator 104 reads content from data corpus 102 and identifies data items with the content. It may then insert the data items into Bloom filter 108.

The size of Bloom filter 108 may be chosen by Bloom filter populator 104 to be as large as possible within memory, disk constraints and policy associated with computing device 105. In an embodiment, Bloom filter populator 104 may read data corpus 102 one or more times to determine the amount of memory that is needed to instantiate Bloom filter 108. Additionally, a separate Bloom filter 108 may be allocated for each user associated with computing system 105 based on the size of content associated with the user in data corpus 102.

In an embodiment, to insert a data item into a Bloom filter 108, Bloom filter populator 104 provides the data item to each one of the k hash functions described earlier and enters the hashed results generated by the hash functions as an offset into Bloom filter 108's bit vector, setting a bit at a position indicated by the output of the k hash functions. As an example, a bit in Bloom filter 108 may be set to '1'. If the bit is already set, Bloom filter populator 104 may not modify the bit.

In an embodiment, Bloom filter populator 104 may read a plurality of user's emails that are stored in a data corpus 102. It may then identify "term pairs" within each user's email and insert the term pairs into Bloom filter 108 by providing the terms pairs to each one of the k hash functions.

As an example, if an email includes the text "a dog and a duck", Bloom filter populator 104 may identify term pairs to be "a/and", "a/dog", "a/duck", "and/dog", "and/duck", and "dog/duck". Once the term pairs have been identified, Bloom filter populator 104 may hash the term pairs using the k hash functions.

Bloom filter populator 104 may then enter the hashed results generated by the k hash functions as an offset into Bloom filter 108's bit vector, setting a bit at a position indicated by the output of the k hash functions.

This example is illustrative and is not intended to limit the invention. Different methods of identifying terms pairs may be used by Bloom filter populator 104. In an embodiment, Bloom filter populator 104 may concurrently identify and insert term pairs into Bloom filter 108.

Figure 2B:
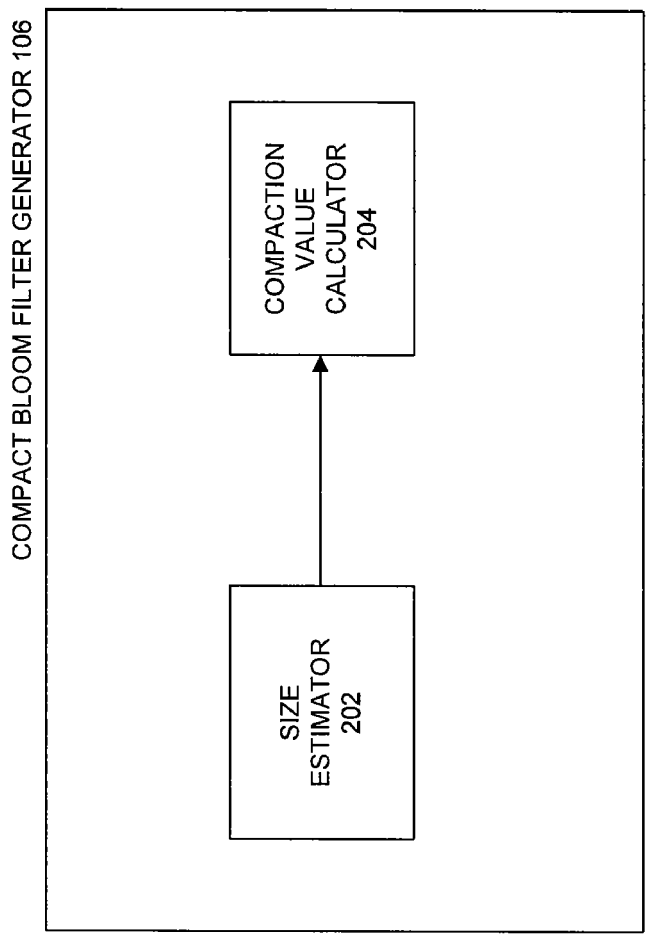
FIG. 2B is a detailed diagram of a compact Bloom filter generator, according to an embodiment of the invention.

Compact Bloom filter generator 106 generates a compact Bloom filter 110. In an embodiment, shown in FIG. 2B compact Bloom filter generator 106 includes size estimator 202 and compaction value calculator 204.

Size estimator 202 counts each unique data item or term pair inserted by Bloom filter populator 104, during the construction of the Bloom filter 108. In an embodiment each unique data item is counted by size estimator 202, to determine a number of entries held in the Bloom filter 108. For instance, where the data items are term pairs, each unique term pair is counted by size estimator 202. This is used to determine optimal size of Bloom filter 108. Size estimator 202 may then use the number to determine an optimal size of a Bloom filter. As an example, not intended to limit the invention, to achieve a 1% false positive rate for a Bloom filter, 9.6 bits need to be allocated data item or term pair in Bloom filter. Other estimates to determine the size of a Bloom filter may be used by size estimator 202.

Compaction value calculator 204 calculates a compaction value based on an optimal Bloom filter size determined by size estimator 202 and size of Bloom filter 108. In an embodiment, the compaction value is a function of the Bloom filter size and the optimal Bloom filter size. For example, in an embodiment, compaction value calculator 204 calculates a compaction value by dividing an optimal Bloom filter size (determined by the size estimator 202) by the size of Bloom filter 108. Compact Bloom filter 106 then generates a compact Bloom filter 110 based on the compaction value. The operation of compact Bloom filter generator 106 is described further below in the description.

Note that while Bloom filter populator 104, compact Bloom filter generator 106, Bloom filter 108, compact Bloom filter 110 and data corpus 102 and are illustrated separately in FIG. 1, functions can be combined in alternative embodiments of the invention. Bloom filter populator 104 and compact Bloom filter generator 106 can be consolidated, for example. Other entities in FIG. 1 may likewise be consolidated. In addition, Bloom filter populator 104, compact Bloom filter generator 106, Bloom filter 108, compact Bloom filter 110 and data corpus 102 can be run on a single computing device 105 as shown, or can be distributed across multiple computing devices coupled to one another locally or remotely over computer network(s).

2. Exemplary Overall Operation

Figure 3A:
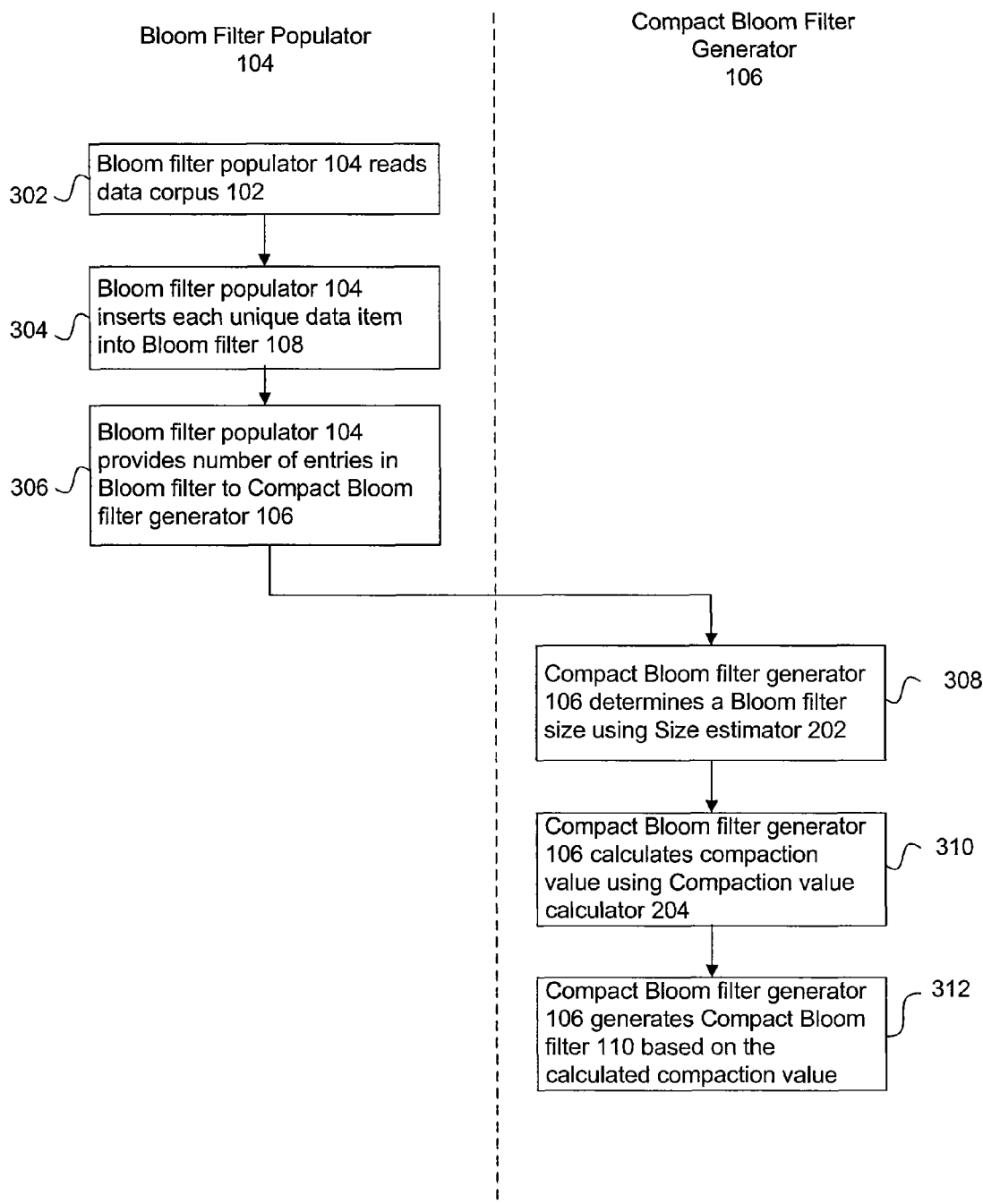
FIG. 3A is a flowchart illustrating the generation of a compact Bloom filter, according to an embodiment of the invention.

FIG. 3A illustrates method 300 which describes an exemplary overall operation of the system illustrated in FIG. 1.

Method 300 begins with Bloom filter populator 104 reading data items from data corpus 102 (step 302). As an example, Bloom filter populator 104 may read term pairs from data corpus 102. In this example, Bloom filter populator 104 reads term pairs appearing within the content of user's emails stored in data corpus 102.

Bloom filter populator 104 may then insert each unique data item into Bloom filter 108 (step 304). As described earlier, for example, Bloom filter populator 104 may identify "term pairs" within each user's email and insert the term pairs into Bloom filter 108 by providing the terms pairs to each one of the k hash functions. Bloom filter populator 104 may then enter the hashed results generated by the k hash functions as an offset into Bloom filter 108's bit vector, setting a bit at a position indicated by the output of the k hash functions.

Bloom filter populator 104 may then provide a count of the number of entries that have been inserted in to Bloom filter 108 to compact Bloom filter generator 106 (step 306). In another embodiment, Bloom filter populator 104 may provide an estimate of the number of entries in Bloom filter 108, if an inherent false positive error rate is associated with Bloom filter 108.

Compact Bloom filter generator 106 then determines a size of a Bloom filter based on input from Bloom filter populator 104 in step 306 (step 308). In an embodiment, compact Bloom filter generator 106 determines an optimal size of a Bloom filter using size estimator 202. In an embodiment each unique data item (such as, a term pair) is counted by size estimator 202, to determine a number of entries held in the Bloom filter 108. Size estimator 202 may then use the number to determine an optimal size of a Bloom filter.

Compact Bloom filter generator 106 then calculates a compaction value based on the size of the Bloom filter determined in step 308 (step 310). In an embodiment, compact Bloom filter generator 106 calculates a compaction value using compaction value calculator 204. Compaction value calculator 204 calculates a compaction value by dividing an optimal Bloom filter size (determined by the size estimator 202) by the size of Bloom filter 108. As an example, compaction allows the size to be reduced by any exact divisor of the number of bits of Bloom Filter 108. Furthermore, for example, a feasible compaction value can be found by compaction value calculator 204 by finding the highest integer below the ideal ratio which divides exactly into the size of the size of Bloom Filter 108. In an example, if Bloom filter 108 has a bit vector which an exact power of two bits, the divisor must also be a power of two, and can be determined rapidly by compaction value calculator 204 by finding the highest power of two less than the ideal ratio. Thus in exemplary cases where Bloom filter 108 has a bit vector that is an exact power of two bits, the time needed to calculate a compaction value is further reduced. In another example, if Bloom filter 108 has a bit vector with a size equal to a product of prime numbers, it may allow for more efficient compaction.

Compact Bloom filter generator 106 then generates a compact Bloom filter 110 based on at least the compaction value (step 312). The construction of compact Bloom filter 110 and step 312 is described in detail further below.

3. Compact Bloom Filter Generator 106

Figure 3B:
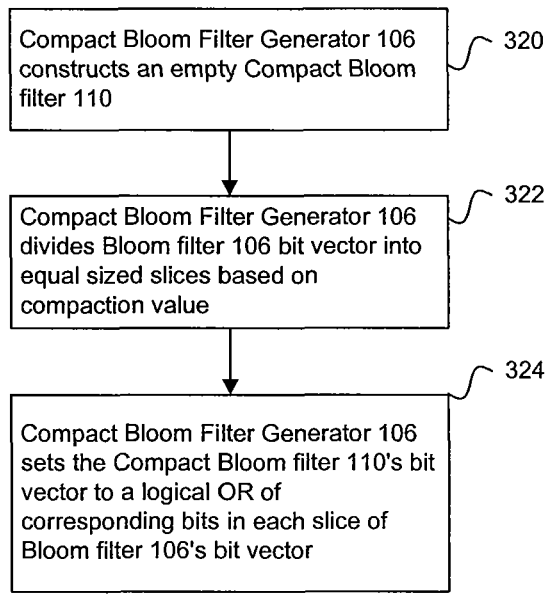
FIG. 3B is a flowchart illustrating the construction of a compact Bloom filter in greater detail, according to an embodiment of the invention.

FIG. 3B is a flowchart illustrating step 312 of FIG. 3A in further detail and illustrates the construction of compact bloom filter 110 by compact Bloom filter generator 106 (steps 320-322).

Compact Bloom filter generator 106 initially constructs an empty compact Bloom filter 110 (step 320). As an example, an empty compact Bloom filter 110 may not include any data items or terms pairs and is yet to be populated. In an embodiment, an empty compact Bloom filter 110 is constructed with a bit vector of size equal to the size of the Bloom filter 108's bit vector divided by the compaction value calculated by compaction value calculator 204 (in step 310).

Compact Bloom filter generator 106 then divides the bit vector of Bloom filter 108 into equal size slices based on the compaction value calculated by compaction value calculator 204 (step 322). As an example, if the compaction value is 2 and the size of Bloom filter 108's bit vector is 12 bits, Bloom filter 108's bit vector would be divided into 2 slices (i.e. 12/6) of 6 bits each. This example is illustrative and is not intended to limit the invention.

Compact Bloom filter generator 106 then sets the bits of compact Bloom filter 110's bit vector to a logical OR of the corresponding bits in each slice of Bloom filter 108's bit vector (step 324). As an example, not intended to limit the invention, if Bloom filter 108's bit vector is divided into 2 slices of 6 bits each, then the corresponding bits in each of the 2 slices will be logically ORed to generate a bit of compact Bloom filter 110. For example, bit 0 of the first slice will be logically ORed with bit 0 of the second slice. The result, will then be placed in bit 0 of compact Bloom filter 110. In this way a compact Bloom filter having a bit vector of six bits will be generated using a logical OR operation. Although this example, describes the operation with a logical OR operator, it is to be appreciated that other mathematical operations that produce similar results may be used. Furthermore, it is to be appreciated that although compact Bloom filter 110 is being populated, data corpus 102 is not being re-read in order to populate compact Bloom filter 110. In this embodiment, population of compact Bloom filter 110 is accomplished by performing one or more logical operations on bits of Bloom filter 108 and the results of these operations are used to set appropriate bits in compact Bloom filter 110. In this way, compact Bloom filter 110 is generated in a single pass, without having to re-read data corpus 102, resulting in a reduction in processing time.

Figure 4:
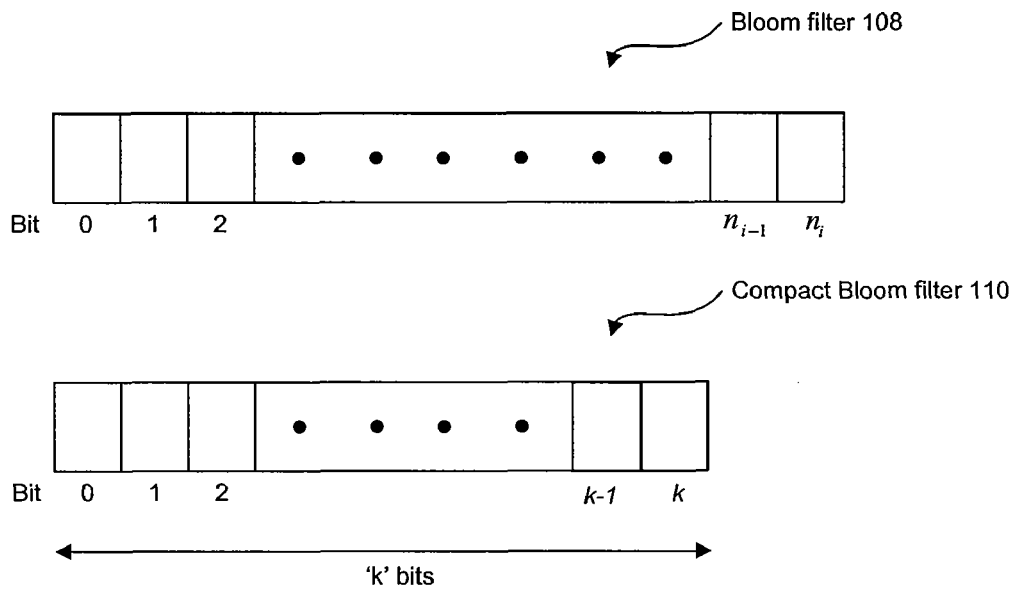
FIG. 4 is a diagram illustrating exemplary Bloom filter bit vectors, according to an embodiment of the invention.

In general terms and according to an embodiment of the invention, bit 'n' of the compact Bloom filter 110's bit vector is set to the logical OR of bits n, n+k, n+2k . . . n+(r−1)k of the Bloom filter 108's bit vector, where r is the compaction value, and k is the size of the Bloom filter 110's bit vector. This approach where bit 'n' of the compact Bloom filter 110's bit vector is set to the logical OR of bits n, n+k, n+2k . . . n+(r−1)k of the Bloom filter 108's bit vector is used because a Bloom filter has entries inserted by setting several bits in the bits vector at locations given by forming several hashes of the entry modulo the size of the bit vector. To illustrate this description, consider FIG. 4 which illustrates an exemplary Bloom filter 108 of '$n_i$' bits and compact Bloom filter 110 of 'k' bits. In this case, each bit 'nc' of compact Bloom filter 110 may be set (e.g. set to '1') based on the output of the equation, $$nc_i = n_i \oplus n_{i+k} \oplus n_{i+2k} \ldots \oplus n_{i+(r-1)k}$$

where, "$\oplus$" is a logical OR operator.

In exemplary cases where the size of the compact Bloom filter 110's bit vector is a multiple of the word size of memory associated with computing device 105, compact Bloom filter generator 106 may allow a logical OR operation to be performed word by word. In general terms, not intended to limit the invention, this may be expressed as:

$$wc[j] = w[j] | wc[j+k/K] | wc[j+2*k/K] \ldots | wc[j+r/K-1],$$

where "w" and "wc" are the words in memory corresponding to bit vectors of Bloom filter 108 and compact Bloom filter 110 respectively, K is the number of bits in each word of memory associated with computing device 105, and "|" is the bitwise logical OR operator.

It may be observed, for example, that the compaction of the Bloom filter 108 may be done "in place" by replacing each of the first 'k' bits in the Bloom Filter 108 with the calculated bit values for compact Bloom filter 110. This may be useful where Bloom filter 108 values are no longer useful after construction of the compact Bloom filter 110 and avoids the need to allocate additional separate memory for compact Bloom filter 110. The remaining bits in the Bloom filter 108 may then be re-used for other purposes.

In another embodiment, compaction of Bloom filter 108 is achieved by generating a compact Bloom filter 110 where if bit ($h_n$% rk) is set in Bloom filter 108 then bit ($h_n$% k) will be set in compact Bloom filter 110 by compact Bloom filter generator 106. In this case "$h_n$" represents an exemplary hash function and "%" is the modulo operator. As described earlier, hash functions are associated with a Bloom filter and are used to insert data items into the Bloom filter. A modulo operator, for example, performs a modulo operations to find the remainder of division of one number by another.

In an exemplary case where, the size of Bloom filter 108's bit vector is 7 bits, bits ($h_1$% rk), ($h_2$% rk), ($h_3$% rk), ($h_4$% rk), ($h_5$% rk), ($h_6$% rk), and ($h_7$% rk) would be set in the Bloom filter's 108 bit vector by Bloom filter populator 104, where $h_1$, $h_2$, $h_3$, $h_4$, $h_5$, $h_6$, $h_7$ are the different hash functions and "%" is the modulo operator. Furthermore, the locations at which these bits are set need not be distinct. Continuing with the same example, compact Bloom filter generator 106 then generates compact Bloom filter 110 by setting bits ($h_1$% k), ($h_2$% k), ($h_3$% k), ($h_4$% k), ($h_5$% k), ($h_6$% k), and ($h_7$% k) in compact Bloom filter 110.

In this way, compact Bloom filter 110 may be generated without re-reading data corpus 102 to populate compact Bloom filter 110. Thus, compact Bloom filter 110 is generated in a single pass over data corpus 102 and results in reduced processing time.

Once the compacted Bloom filter 110 has been generated it may be written to a disk or any other storage device by compact Bloom filter generator 106.

The embodiments described above may be used for different applications, including but not limited to, improving the quality of results when a user searches through content of emails or any content in data corpus 102.

In an example, compact Bloom filter 110 may be used to suggest better spelling for potentially misspelled term pairs in a way that only the pairs of suggestions that actually occur within email or content in data corpus 102 are suggested to a user. As an example, compact Bloom filter 110 that includes all adjacent terms (e.g. "a/and, "a/dog", "a/duck", "and/dog") is used to give priority in results to terms occurring together, or for preferring suggestions of adjacent terms. This may be particularly useful where the term pairs are people's names.

4. Example Computer Embodiment

Figure 5:
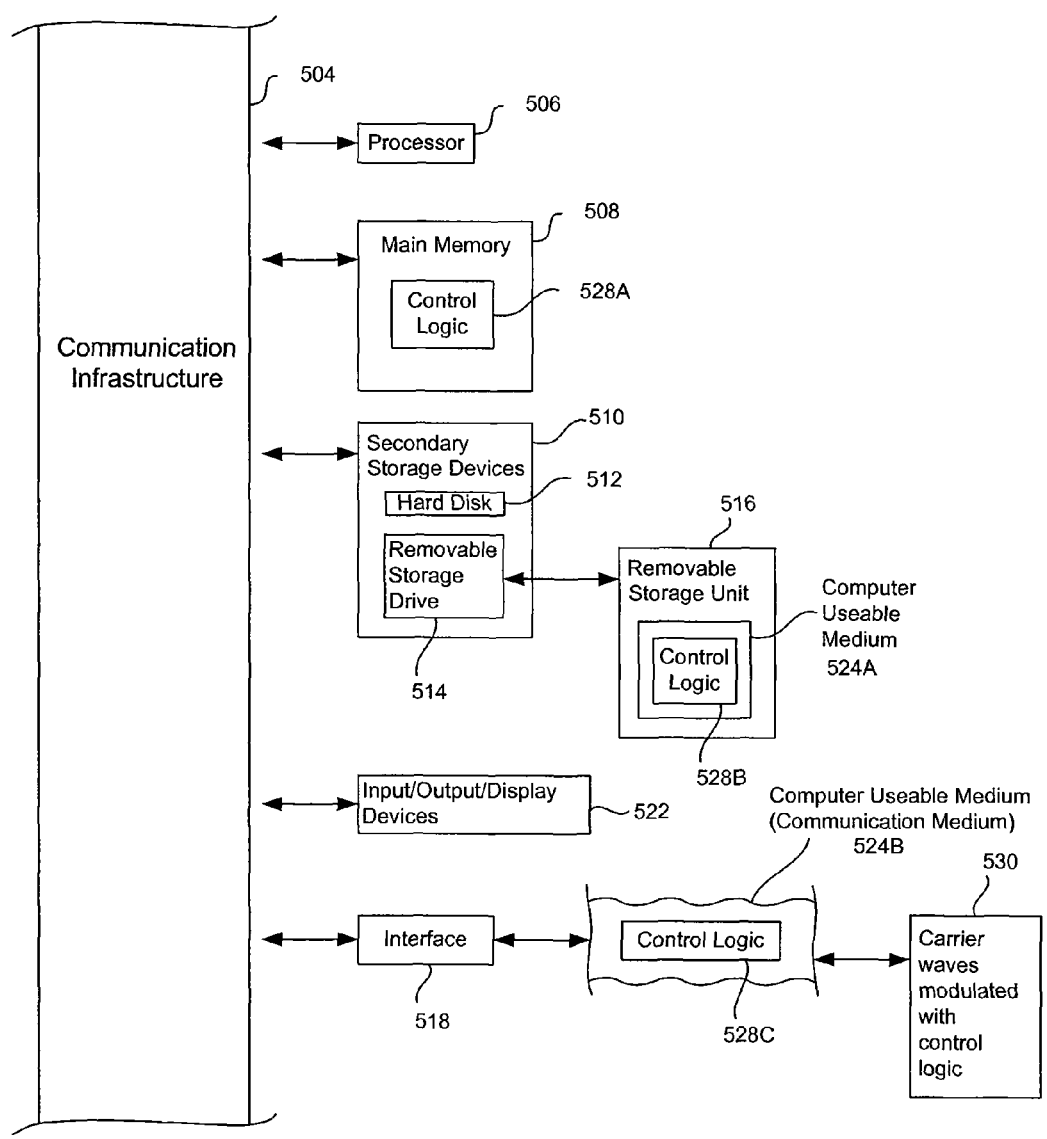
FIG. 5 illustrates an example computer useful for implementing components of embodiments of the invention.

In an embodiment of the present invention, the system and components of embodiments described herein are implemented using well known computers, such as example computer 502 shown in FIG. 5. For example, Bloom filter populator 104 or compact Bloom filter generator 106 can be implemented using computer(s) 502.

The computer 502 can be any commercially available and well known computer capable of performing the functions described herein, such as computers available from International Business Machines, Apple, Sun, HP, Dell, Compaq, Digital, Cray, etc.

The computer 502 includes one or more processors (also called central processing units, or CPUs), such as a processor 506. The processor 506 is connected to a communication infrastructure 504.

The computer 502 also includes a main or primary memory 508, such as random access memory (RAM). The primary memory 508 has stored therein control logic 525A (computer software), and data.

The computer 502 also includes one or more secondary storage devices 510. The secondary storage devices 510 include, for example, a hard disk drive 512 and/or a removable storage device or drive 514, as well as other types of storage devices, such as memory cards and memory sticks. The removable storage drive 514 represents a floppy disk drive, a magnetic tape drive, a compact disk drive, an optical storage device, tape backup, etc.

The removable storage drive 514 interacts with a removable storage unit 516. The removable storage unit 516 includes a computer useable or readable storage medium 524 having stored therein computer software 528B (control logic) and/or data. Removable storage unit 516 represents a floppy disk, magnetic tape, compact disk, DVD, optical storage disk, or any other computer data storage device. The removable storage drive 514 reads from and/or writes to the removable storage unit 516 in a well known manner.

The computer 502 also includes input/output/display devices 522, such as monitors, keyboards, pointing devices, etc.

The computer 502 further includes a communication or network interface 518. The network interface 518 enables the computer 502 to communicate with remote devices. For example, the network interface 518 allows the computer 502 to communicate over communication networks or mediums 524B (representing a form of a computer useable or readable medium), such as LANs, WANs, the Internet, etc. The network interface 518 may interface with remote sites or networks via wired or wireless connections.

Control logic 528C may be transmitted to and from the computer 502 via the communication medium 524B. More particularly, the computer 502 may receive and transmit carrier waves (electromagnetic signals) modulated with control logic 530 via the communication medium 524B.

Any apparatus or article of manufacture comprising a computer useable or readable medium having control logic (software) stored therein is referred to herein as a computer program product or program storage device. This includes, but is not limited to, the computer 502, the main memory 508, secondary storage devices 510, the removable storage unit 516 and the carrier waves modulated with control logic 530. Such computer program products, having control logic stored therein that, when executed by one or more data processing devices, cause such data processing devices to operate as described herein, represent embodiments of the invention.

Embodiments of the invention can work with software, hardware, and/or operating system implementations other than those described herein. Any software, hardware, and operating system implementations suitable for performing the functions described herein can be used. Embodiments of the invention are applicable to both a client and to a server or a combination of both.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method for Bloom filter compaction comprising the following steps implemented with at least one processor:
    inserting a plurality of data items from a data corpus into a first Bloom filter represented by a first bit vector;
    determining a filter size based on a number of the data items inserted into the first Bloom filter;
    dividing the first bit vector representing the first Bloom filter into a plurality of slices based on the filter size and a size of the first Bloom filter; and
    generating a second Bloom filter represented by a second bit vector from the plurality of slices of the first Bloom filter, wherein the second Bloom filter is a compact representation of the first Bloom filter and one or more bits in the second bit vector are based on an evaluation of corresponding bits in each slice resolved from the first bit vector representing the first Bloom filter.

2. The method of claim 1, further comprising determining the number of data items inserted in the inserting step.

3. The method of claim 1, further comprising determining a number of unique data items inserted in the inserting step.

4. The method of claim 3, wherein the determining step comprises:
    determining each unique term pair in the data corpus.

5. The method of claim 1, further comprising:
    calculating a compaction value; and
    using the compaction value to generate the second Bloom filter.

6. The method of claim 5, wherein the calculating the compaction value comprises:
    dividing the size of the first Bloom filter by the filter size.

7. The method of claim 1, wherein the calculating the filter size comprises:
    calculating an optimal filter size based on a pre-determined false positive rate and a number of the data items.

8. The method of claim 1, further comprising:
    storing the generated second Bloom filter on a computer-readable storage medium.

9. The method of claim 1, wherein the evaluation in the generating step includes performing a logical OR operation.

10. A processor-based system for Bloom filter compaction comprising:
    one or more processors;
    a Bloom filter populator configured to insert a plurality of data items from a data corpus into a first Bloom filter represented by a first bit vector; and
    a compact Bloom filter generator configured to:
        determine a filter size based on a number of the data items inserted into the first Bloom filter;
        divide the first bit vector representing the first Bloom filter into a plurality of slices based on the filter size and a size of the first Bloom filter; and
        generate a second Bloom filter represented by a second bit vector from the plurality of slices of the first Bloom filter, wherein the second Bloom filter is a compact representation of the first Bloom filter and one or more bits in the second bit vector are based on an evaluation of corresponding bits in each slice resolved from the first bit vector representing the first Bloom filter, wherein the Bloom filter populator and the compact Bloom filter generator are implemented on the one or more processors.

11. The system of claim 10, wherein the compact Bloom filter generator further comprises:
   a size estimator to calculate the filter size based on a number of the data items; and
   a compaction value calculator to calculate the compaction value based on the size of the first Bloom filter and the filter size.

12. The system of claim 10, wherein the data corpus comprises a plurality of emails.

13. The system of claim 10, wherein the plurality of data items include terms from a one or more emails.

14. The system of claim 10, wherein the data items are term pairs.

15. A computer-readable storage device having computer-executable instructions stored thereon, execution of which, by a computing device, causes the computing device to perform operations comprising:
   inserting a plurality of data items from a data corpus into a first Bloom filter represented by a first bit vector;
   determining a filter size based on a number of the data items inserted into the first Bloom filter;
   dividing the first bit vector representing the first Bloom filter into a plurality of slices based on the filter size and a size of the first Bloom filter; and
   generating a second Bloom filter represented by a second bit vector from the plurality of slices of the first Bloom filter, wherein the second Bloom filter is a compact representation of the first Bloom filter and one or more bits in the second bit vector are based on an evaluation of corresponding bits in each slice resolved from the first bit vector representing the first Bloom filter.

16. The computer-readable storage device of claim 15, the operations further comprising:
   determining the number of data items inserted in the inserting step.

17. The computer-readable storage device of claim 15, the operations further comprising:
   determining a number of unique data items inserted in the inserting step.

18. The computer-readable storage device of claim 17, wherein the determining step comprises:
   determining each unique term pair in the data corpus.

19. The computer-readable storage device of claim 15, the operations further comprising:
   calculating a compaction value; and
   using the compaction value to generate the second Bloom filter.

20. The computer-readable storage device of claim 19, wherein calculating the compaction value comprises:
   dividing the size of the first Bloom filter by the filter size.

21. The computer-readable storage device of claim 15, wherein determining the filter size comprises:
   determining an optimal filter size based on a pre-determined false positive rate and the number of the data items.

22. The computer-readable storage device of claim 15, the operations further comprising:
   storing the generated second Bloom filter on the computer-readable storage medium.

* * * * *